United States Patent [19]

Schmidt et al.

[11] Patent Number: 4,928,176
[45] Date of Patent: May 22, 1990

[54] ELECTRONIC CAMERA-PROCESSING CIRCUIT FOR AUTOMATICALLY TRACKING PARTICLES WHICH MOVE ACROSS AN OPTICAL IMAGE

[75] Inventors: Karl-Heinz Schmidt, Aying; Wilhelm Waidelich, Munich, both of Fed. Rep. of Germany

[73] Assignee: Gesellschaft fur Strahlen, Fed. Rep. of Germany

[21] Appl. No.: 178,645

[22] Filed: Apr. 7, 1988

[30] Foreign Application Priority Data

Apr. 8, 1987 [DE] Fed. Rep. of Germany ....... 3711918

[51] Int. Cl.⁵ .............................................. H04N 7/18
[52] U.S. Cl. .................................. 358/126; 358/125; 358/105; 358/107
[58] Field of Search ................. 358/126, 125, 107, 93, 358/105; 364/565

[56] References Cited

U.S. PATENT DOCUMENTS

| | | | |
|---|---|---|---|
| 3,780,223 | 12/1973 | Perry | 358/126 X |
| 3,988,534 | 10/1976 | Sacks | 358/126 |
| 4,053,929 | 10/1977 | Collins, III et al. | 358/126 |
| 4,219,847 | 8/1980 | Pinkney et al. | 358/105 X |
| 4,220,967 | 9/1980 | Ichida | 358/105 |
| 4,270,143 | 5/1981 | Morris | 358/105 X |
| 4,449,144 | 5/1984 | Suzuki | 364/565 X |
| 4,731,745 | 3/1988 | Katagiri et al. | 358/107 X |

*Primary Examiner*—James J. Groody
*Assistant Examiner*—Victor R. Kostak

[57] ABSTRACT

An electronic camera combined with processing circuitry for observing the movement of particles in a sedimentation cell or the like, tracking movement of selected particles, and determining their velocity and/or velocity distribution. The electronic circuit includes an electronic masking circuit for enabling the selection and tracking of individual particles in the image received by the camera.

4 Claims, 2 Drawing Sheets

ELECTRONIC CAMERA-PROCESSING CIRCUIT FOR AUTOMATICALLY TRACKING PARTICLES WHICH MOVE ACROSS AN OPTICAL IMAGE

BACKGROUND OF THE INVENTION

The present invention relates to improved digital circuits for automatically tracking particles moving across a video image in the form of signal dots, and determining their velocity or velocity distribution. The video image is detected by an electronic camera and the video camera output is electronically processed.

A circuit arrangement of a similar type is disclosed in German Pat. No. 2,905,118 which corresponds to U.S. Pat. No. 4,238,767. However, this earlier circuit is more complicated and not suitable for measuring particle mixtures having an inhomogeneous velocity distribution. Additionally, dot-by-dot tracking of particles cannot be performed by this earlier circuit.

It is an object of the present invention to improve the above-mentioned circuit arrangement in such a way that it is possible to track individual particles in the video image to determine their velocities or velocity distribution, particularly for particles moving in sedimentation cells.

SUMMARY OF THE INVENTION

The circuit arrangement according to the invention comprises a scannable electro-optical device for observing an image and generating a serial electrical output signal synchronized with the scanning of each pixel in the image, horizontal and vertical gating means for horizontally and vertically gating the output signal to screen out all signals except those occurring within fixed horizontal and vertical dimensions of the image, and tracking means responsive to the gating means and the output signal for tracking selected particles in the image. More specifically, it comprises a charge-coupled device (CCD) electronic camera for receiving a television image from a sample such as a sedimentation cell, an electronic hardware module in which the image is processed, and a display terminal on which the velocity of the particles is visually displayed. The hardware module selects a particle from the video signal, determines its velocity, and displays its value on the screen of the terminal when the minimum tracking path is exceeded.

In order to track particles which are only partially recordable, for example, because they leave the focal image plane of the camera, the velocity of the particles can be determined from the available data and, upon the disappearance of the particle, an electronic mask filters the output of the camera to pass only selected portions of the video image containing the selected particles.

To reliably record particles at different velocities, the electronic digital mask is shifted in the direction of movement of the particles after each image field is processed. It is possible, for example, to measure drift velocities of ions in an electrophoresis apparatus. To determine the velocity distribution of a particle, the digital position of the particle in the image is stored after each image field and the distribution is determined from these stored data.

The entire electronic system can be made very small and can therefore be easily accommodated in the slightly enlarged housing of a sedimentation cell.

By displacing an electronic digital mask, only the one particle to be tracked over the image field can be selected. The positions of the mask are recalculated after each scanning field from the last digital coordinates of the particle under consideration and its actual velocity. The electronic mask is produced in part by circuit hardware and/or in part by software.

DESCRIPTION OF THE PREFERRED EMBODIMENTS

Figure 1:
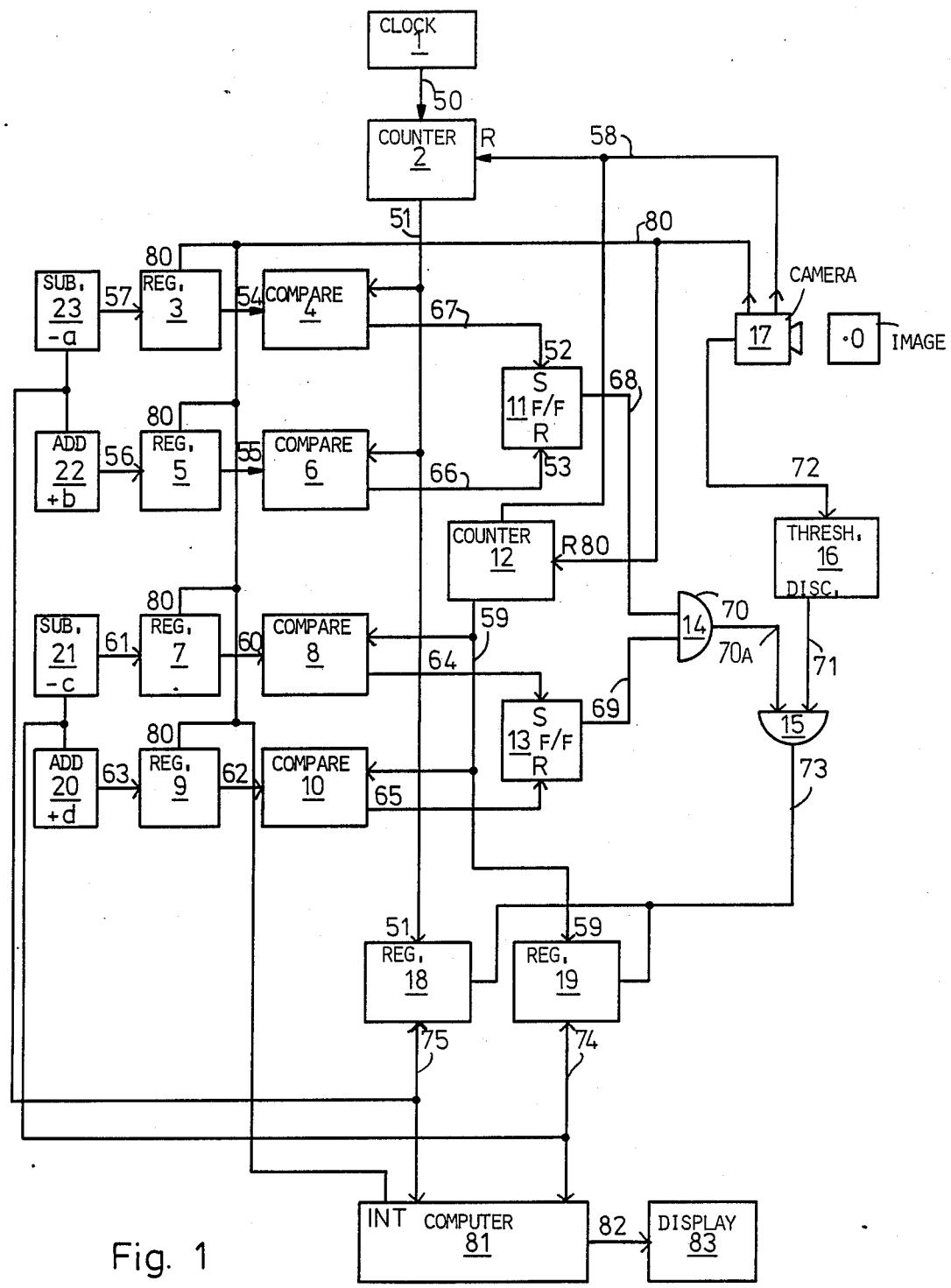
FIG. 1 is a block diagram showing a preferred embodiment of the invention.
Figure 2:
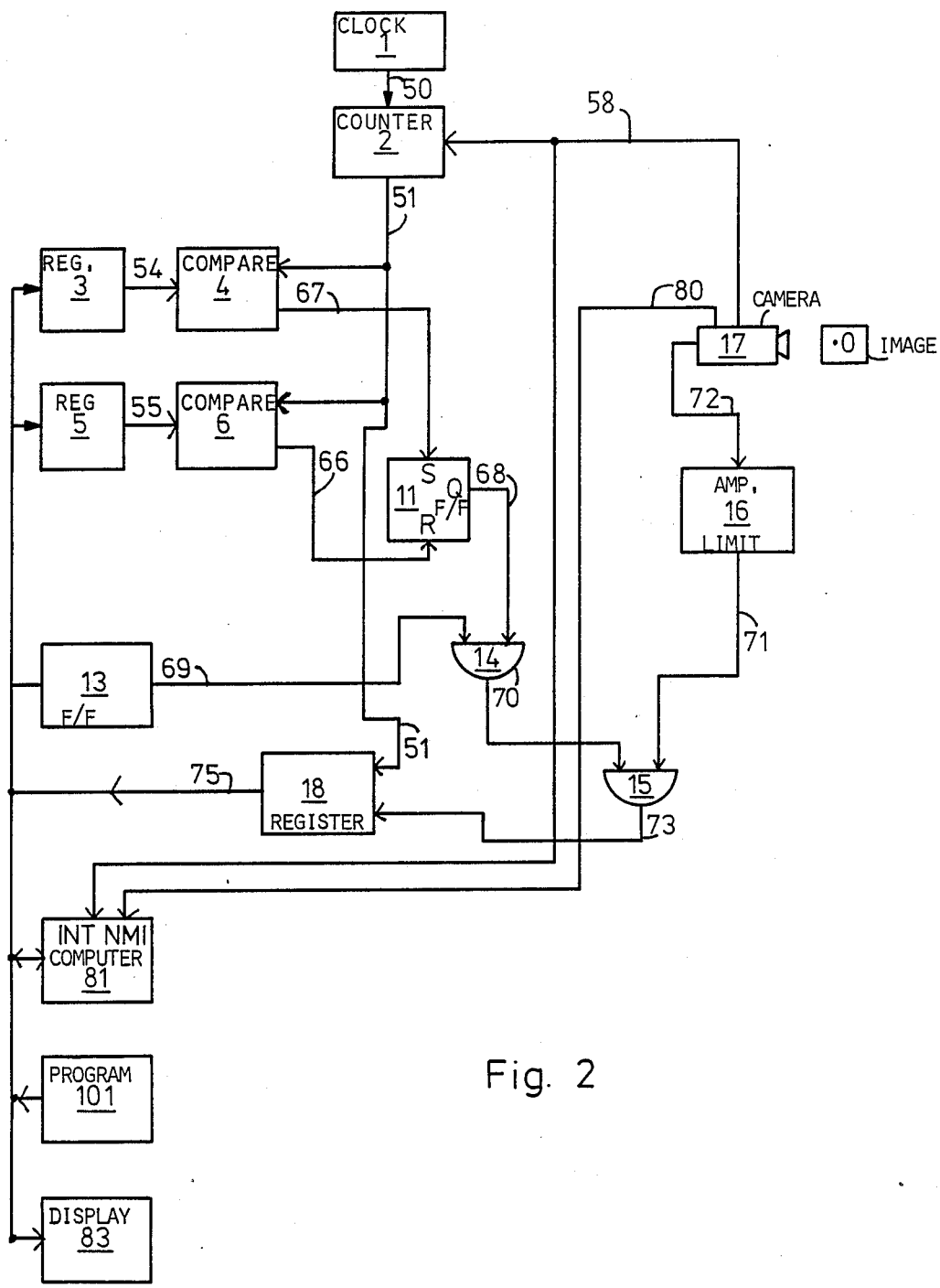
FIG. 2 is a block diagram similar to FIG. 1 showing an alternative embodiment.

The operation and structure of the circuit arrangement according to the invention will be described in greater detail with reference to two embodiments which are illustrated in FIGS. 1 and 2.

In order to initially detect all particles in the image, a broad rectangle oriented transversely to the direction of movement of the particles is selected as the starting electronic digital mask aperture. Once a particle has been detected, the mask aperture is kept as small as possible in order to filter out or avoid any influence from other particles in the image.

An image is detected by a television camera 17 and is there converted or read out as a serial electronic signal 72. A pair of counters 2 and 12, in the electronic system, are operated in synchronism with the scanning read beam of the video camera 17 so that each different position of the image (pixel) is represented by a horizontal count 51 and a vertical count 59. If the video signal 72 exceeds a certain value, indicating that a bright object is present in the image the counts 51 and 59 in counters 2 and 12 corresponding to the digital position of the detected particle are stored in registers 18 and 19, respectively.

The count 51 in register 18 corresponds to the horizontal location of a detected particle and the count 59 in register 19 to the vertical location of the particle.

The count 51 is directed over line 75 to subtractor 23 and adder 22 where a quantity "a" and a quantity "b" are subtracted and added respectively. The difference count 57 is stored in register 3 and the sum count 56 is stored in register 5. The counts 54 and 55 at the outputs of registers 3 and 5 are each directed to a respective one of comparison modules 4 and 6, which emit signals 67 and 66 respectively whenever the count 51 and recorded value 54 or 55 coincide. These two signals 67 and 66 function to alternately switch a flip flop 11 on and off so that a horizontal gating signal 68 is generated during each horizontal scanline of the camera 17.

A vertical gating signal is generated in the same manner at the output of a flip flop 13. That is, the count 59 is directed over line 74 to subtractor 21 and adder 20 where a quantity "c" and a quantity "d" are subtracted and added respectively. The difference count 61 is stored in register 7 and the sum count 63 is stored in register 9. The outputs 60 and 62 of registers 7 and 9 are each directed to a respective one of comparison modules 8 and 10 which emit signals 64 and 65 respectively whenever the count 59 and recorded value 60 or 62 coincide. These two signals 64 and 65 alternately switch a flip flop 13 on and off so that a vertical gating signal 69 is generated during each vertical scanline of the camera 17.

Both gating signals 68 and 69 are applied to an AND gate 70 so that an electronic mask aperture signal 70a is produced to screen the TV signal 71 from the image field. The TV output 72 is initially threshold filtered by amplitude discriminator 16, and its output 71 is passed to AND gate 15. Therefore the camera video signals from camera 17 are passed over output line 73 only for the detected particles that are present within the electronic mask aperture as indicated by the presence of signal 70a at the output of AND gate 70.

If now the electronic mask aperture or window and the density of observed particles are made so small that only one particle is detected in the window, it is possible to select that one particle and track it. With the above-stated procedure, the electronic mask aperture coordinates as indicated by the counts 54, 55, 60 and 62 at the outputs of registers 3, 5, 7 and 9 are changed after each scanned image field of the camera 17, to respective positions corresponding to counts 51 and 59. The maximum velocity results if, during the procedure following determination of the position of the particle, the detected particle is still present in the image field.

If it is now assumed that the particles move vertically in a straight line through the detected camera image, counting the particles provides the path and counting the camera fields provides the time, while both counts together provide the velocity of the particles.

Further describing the circuit arrangement of FIG. 1:

Upon generating an output clock signal 50, a 10 MHz clock pulse generator 1 triggers the counter 2, which during each horizontal line blanking period of scanning camera 17 is reset by a line sync signal 58. The count 51 in counter 2 is therefore synchronized with each horizontal scan line of the read beam in camera 17. The comparator module 4 compares the horizontal counting signal 51 with the count 54 stored in register 3 which defines the start of the aperture. When start count 51 is equal to count 54, comparator 4 generates an output signal 67 which switches "on" the flip flop 11 to begin the electronic mask aperture. The horizontal count 55 stored in register 5 defines the end of the aperture and is applied to comparator 6 along with the horizontal count signal 51. When count 51 equals end count 55, comparator 6 generates output signal 66 which resets the flip flop 11. Therefore, a horizontal aperture signal 68 is present at the output of flip flop 11, and this is applied to AND gate 70 along with a vertical aperture signal 69.

The vertical aperture signal 69 is produced as follows:

The horizontal sync signal 58 of camera 17 triggers the line counter 12 which is reset by the vertical sync signal 80. This occurs at the end of each entire field of sweep of the camera 17. Count 59 from counter 12 is then controlled to be synchronous with the vertical movement of the reading beam in camera 17. During each scan frame the comparator 8 compares the increasing vertical count signal 59 with a start count 60 stored in register 7. When count 59 is equal to stored count 60, the comparator 8 generates an output signal 64 which switches "on" a flip flop 13. A vertical stop count 62 is stored in register 9, and is compared in comparator 10 with the increasing vertical count 59. When count 59 equals stop count 62, comparator 10 generates a signal 65 to reset the flip flop 13. The vertical output mask aperture signal 69 is therefore present at the output of flip flop 13 during the time interval in which it is "on."

Horizontal electronic mask aperture signal 68 and vertical electronic mask aperture signal 69 are applied to AND gate 70. The output signal 70a from gate 70 is the electronic mask aperture signal which occurs during each scanning field only when the scanning beam of the camera 17 is disposed within the horizontal and vertical mask apertures as defined by the counts 54, 55, 60 and 62 stored in registers 3, 5, 7 and 9 respectively.

The video output signal 72 from camera 17 is amplitude limited by the threshold discriminator 16 so that the output signal 71 from camera 17 is only passed for detected particles having amplitudes which are greater than the threshold setting of discriminator 16. Signal 71 is then transmitted to AND gate 15 together with the electronic mask aperture signal 70a from gate 70. When a selected particle is present in the aperture of the image field, the counts 51 and 59 representing the horizontal and vertical coordinates of the camera beam are gated into registers 18 and 19. The position of a particle is thus stored in registers 18 and 19.

The width of the electronic mask aperture in the horizontal direction is determined by the sum of the constants a and b, and the height of the aperture in the vertical direction is determined by the sum of the constants c and d. Horizontal and vertical starting counts 57 and 61 are obtained using the outputs of register 18 and 19 respectively and subtracting the constants a and c. When each vertical scan of camera 17 is completed, the vertical sync signal 80 triggers the storage of counts 57, 56, 61 and 63 in the start and stop registers 3, 5, 7 and 9 respectively which then redefines the electronic mask aperture for the next scanned image field of camera 17.

The mask aperture for each scan is thus determined by the previous position of a detected particle during the earlier scan. To ensure that, at greater velocities, the particle again falls within the mask aperture during the next field scanned by the camera 17, constants a, b, c and d are selected accordingly.

A computer 81 that is interrupt controlled, reads out particle position counts 74 and 75 from register 19 and 18 respectively at the end of each scanned field in the camera 17, and calculates the particle velocity from the change in location from the previous position. This is then displayed on a display device 83 via line 82. After each scanned field, the computer 81 also resets the registers 18 and 19 in preparation for the next scanning field of the camera 17.

FIG. 2 shows an alternative circuit for that of FIG. 1 having an operation which is the same as FIG. 1 except that the functions of components 20–23, 7–10, 12 and 19 are provided by the microprocessor 81 which is controlled by a program stored in memory 101.

The invention described above is also described in the patent application No. P 37 11 918 filed in the Federal Republic of Germany on Apr. 8, 1987, in our entire specification of which is incorporated herein by reference.

What is claimed:

1. The method of automatically tracking a single selected particle moving across an image field as a signal dot, and determining the velocity of said selected particle, comprising the steps of:
   (a) scanning said image field in horizontal and vertical directions to generate an electrical output signal defining said particle, said output signal being synchronized with the scanning of each dot in said image field;
   (b) generating horizontal and vertical counts corresponding respectively to the horizontal and vertical coordinates of said particle;

(c) generating start and end horizontal electronic mask aperture coordinate counts by adding and subtracting respectively first predetermined quantities to said horizontal counts, and storing said horizontal coordinate counts;

(d) generating start and end vertical electronic mask aperture coordinate counts by adding and subtracting respectively second predetermined quantities to said vertical counts, and storing said vertical coordinate counts;

(e) comparing said horizontal coordinate counts with said horizontal counts, and generating a horizontal aperture signal when said horizontal count coincides with said start or end horizontal electronic mask aperture coordinate count;

(f) comparing said vertical coordinate counts with said vertical counts, and generating a vertical aperture signal when said vertical count coincides with said start or end vertical electronic mask aperture coordinate count;

(g) generating an electronic mask aperture signal from said horizontal and vertical aperture signals when said scanning step (a) occurs within an electronic mask defined by said horizontal and vertical electronic mask aperture coordinate counts;

(h) storing said horizontal and vertical counts when the single selected particle in said electrical output signal is within said electronic mask;

(i) repeating said steps (c) to (h) to redefine after each vertical scan said electronic mask aperture for the next scanned image field, the mask aperture for each vertical scan being determined by the position of said particle during the previous scan; and (j) determining the velocity of said particle from the change in position thereof in successive scans.

2. The method as claimed in claim 1 wherein, in step (h), said horizontal and vertical counts are stored only when the amplitude of said electrical output signal exceeds a predetermined threshold value.

3. The method as claimed in claim 1 wherein the particle being tracked is located in a sedimentation cell.

4. The method as claimed in claim 1 wherein the particle being tracked is located in an electophoresis apparatus.

* * * * *